Aug. 22, 1950 D. MITCHELL 2,519,688

SIGNAL CODE TRANSLATOR

Filed Nov. 8, 1946 2 Sheets-Sheet 1

INVENTOR
D. MITCHELL
BY
J. W. Schmied
ATTORNEY

Aug. 22, 1950 D. MITCHELL 2,519,688

SIGNAL CODE TRANSLATOR

Filed Nov. 8, 1946 2 Sheets-Sheet 2

INVENTOR
D. MITCHELL
BY J. W. Schmied
ATTORNEY

Patented Aug. 22, 1950

2,519,688

UNITED STATES PATENT OFFICE 2,519,688

SIGNAL CODE TRANSLATOR

Doren Mitchell, Martinsville, N. J., assignor to Bell Telephone Laboratories, Incorporated, New York, N. Y., a corporation of New York Application November 8, 1946, Serial No. 708,574

22 Claims. (Cl. 179—18)

This invention relates to card translators and more particularly to card translators in which the output registration is effected by photoelectric means.

A feature of this invention is a card translating arrangement which is comparatively simple in construction, easy in operation, compact in form and inexpensive to build.

Another feature of this invention is a card translating arrangement which contains three banks with ten input registers in each bank, corresponding to each of the digits in a three-digit code number, and in which each card is restrained from rotating by the action of one register from each bank.

A further feature of this invention is a card translating arrangement in which the input registers operate to release a particular card so that it may be free to turn on a constantly rotating shaft.

Still another feature of this invention is a card translating arrangement in which the output registration is obtained by means of transparent portions in the card, so that a distinctive pattern of photoelectric energy from light sources may be obtained from the transparent portions when a card rotates.

Another feature of this arrangement stems from the fact that notches cut in the periphery of each card or holes punched along an arc of the card may be used to replace the transparent portions mentioned above as the means for obtaining a distinctive pattern of output registration.

A still further feature of this invention is a card translating system in which a card can be replaced even while the translator is in operation.

Still another feature of the invention is a card translating system in which a number of alternate output codes can be punched on each card in the system and in which a particular output code can be chosen merely by adjusting the distance of the light beam from the rotating shaft.

One more feature of the invention is a card translating system in which a separate light source is provided for each of the alternate output codes on each code so that more than one code can be operated to register simultaneously on separate sets of registers.

Other advantages of the invention will become apparent from the following discussion when taken in conjunction with the accompanying drawings.

A preferred embodiment of the present invention utilizes a plurality of perforated code cards mounted on a common rotating shaft by means of friction clutches which enable the cards to be restrained in stationary position by detent means under the control of an input register, but which also allow any selected card to rotate when its detent is released by operation of the input register. Output registers of the translator are controlled by means of radiant energy directed through the coded perforations of the selected card so that application of an input signal in one code to the input registers operates to select a particular card which in rotation projects through its distinctive perforations a different code to the output register. As the selected code card begins to rotate it first interrupts the radiant energy beam, thus providing a starting impulse for the pulse time circuit of the output register and thereby releasing the rotary contact arm of a distributor switch to rotate simultaneously with the selected card. Thereafter as the card rotates the radiant energy beam then falls on a photosensitive cell intermittently at a rate determined by the pattern of perforations in the card. By this means brief impulses of electrical current are introduced at desired times into the output pulse time circuit. These impulses may then be caused to operate a plurality of output relays in a well-known manner dependent upon their time sequence. In this manner a distinctive pattern of relay contacts is established on the output register in accordance with the code of each card selected.

In accordance with the present invention, a device is contemplated which will be composed of plurality of cards each operative for a different input code number. A particular card is selected when an input code number is dialed and this card then turns on a rotating shaft and registers on some output registers a code which has a distinctively different pattern from the input code. The cards used to obtain the distinctive output pattern are shaped in the form of sectors of a circle and have a series of holes punched in a distinctive pattern along an arc of the sector. Each card is placed in a holder comprising a disc-like central portion and two arms which extend from the central portion at an acute angle with respect to each other, the sides of the card lying in these arms. Attached to one of these arms is a number of stop pins, which serve to engage detent means extending from a plurality of input registers. These input registers are arranged in a plurality of banks, with each bank containing a number of registers corresponding to the number of possible values obtainable for a digit of a code number. Since detent means extend from one register of each bank to engage the stop pins on a card holder and since the combination of detent means for each card may be varied, it may be seen that each card may be made responsive only when a particular code number is dialed. If a particular card is the responsive card, the input register will operate to disengage the detent means from the stop pins and the card will then be free to rotate on a constantly revolving shaft. Until such time as the detent means are released from the stop pins, the card will not rotate with the shaft because of the action of the detent means on the stop pins and also because of the fact that a friction clutch attached to the card holder permits the card to slip while the shaft rotates. Thus, for example, if the input registers are arranged in three banks containing ten registers in a bank and if the selected card is responsive to the number "478," the dialing of "4" as the first number releases the first selecting bar from a stop pin restraining the rotation of the selected card; likewise, the dialing of "7" and "8" as the second and third numbers releases the other two selecting bars from engaging the second and third stop pins, thus permitting the selected card to rotate. As the card rotates, each of the transparent portions arranged circumferentially around an arc of the card becomes aligned with a source of radiating energy and a receiver responsive to the radiating source. Thus the receiver will be actuated in a pattern of pulses which depend upon the position of the transparent portions around the arc. As may be seen, if each card has a different pattern of transparent portions, a distinctive pattern of pulses may be obtained from each card as it rotates. As the card rotates, the rotary contact of a switch rotates in synchronism and passes over a number of stationary contacts on the switch equal to the number of possible positions for holes on the card. An output register is attached to each of these switches and thus only those relays will be operated which correspond in position to transparent portions on the card.

Referring now to the accompanying drawings.

Figure 1:
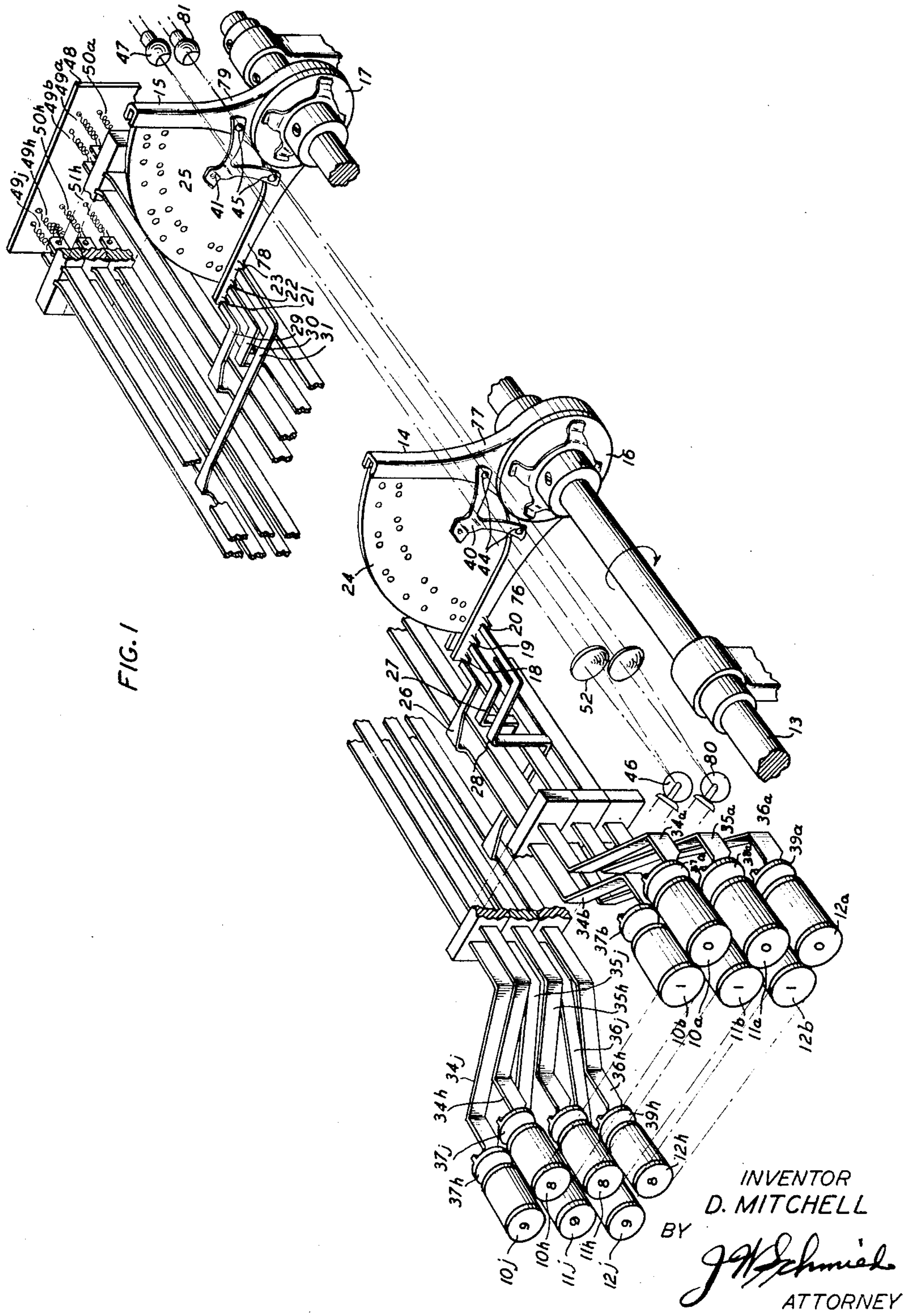
Fig. 1 is a perspective view of the mechanical features of the invention.

In Fig. 1, to which reference is now had, the mechanical features of the invention are shown. In general, these features comprise the three banks of input register relays 10*a* through 10*j*, 11*a* through 11*j*, and 12*a* through 12*j*, inclusive; the rotating shaft 13; the cards 24 and 25; and the card holders 14 and 15 mounted on the shaft 13 but restrained from turning by their respective friction clutches 16 and 17 and by the stop pins 18, 19 and 20 and 21, 22 and 23. The input register relays 10*a* through 10*j*, 11*a* through 11*j*, and 12*a* through 12*j* are arranged in three banks containing ten relays in each bank because the normal input code number in a telephone system usually has three digits with each digit having one of ten possible values. Thus, if the input code number were "478," the fourth input register relay of the first bank, or in other words, the register 10*d*, would be operated; likewise input register relay 11*g* in the second bank and input register relay 12*h* in the third bank would be chosen by the second and third digits of the dial number. The input registers are actually magnets which are actuated when they are chosen. Although three banks of magnets are shown in the drawings, a larger number of banks could be used if the code number were increased above three digits. Likewise, if the possible values for each digit were increased above ten, the number of register relays in each bank would be correspondingly increased.

In close proximity to the magnets 10*a* through 10*j*, 11*a* through 11*j* and 12*a* through 12*j* are a number of selecting bars. These bars, one for each of the registering magnets, are aligned with the axes of their associated magnets, and have magnetic plates at the ends closest to the magnets. These magnetic plates may be cylindrical in form, with the axis of the cylinders aligned with the axis of the associated magnet, and they should be close enough to their respective magnets so as to be attracted by the magnets when the latter are actuated. Thus the selecting bars 34*a* through 34*j*, inclusive, are associated with the magnets 10*a* through 10*j*, respectively and are responsive to their respective magnets because of the action of the magnetic plates 37*a* through 37*j*, respectively. Likewise, the selecting bars 35*a* through 35*j*, inclusive, are responsive to the magnets 11*a* through 11*j*, respectively, because of the proximity of the magnetic plates 38*a* through 38*j*, respectively, and the selecting bars 36*a* through 36*j* are responsive to the magnets 12*a* through 12*j* because of the proximity of the plates 39*a* through 39*j*. The selecting bars extend the length of the row of cards so that connections may be easily made from the bars to any of the card holders. As may be seen in Fig. 1, connection is made to each card holder by means of three detent means, one detent means from each bank of selecting bars. If the number of banks of registers should be increased, the number of detent means extending to each disc would also be increased. These detent means engage stop pins on the card holders and accordingly prevent the holders from rotating. Thus, the detent means 26, 27 and 28, which extend from the selecting bars 10*b*, 11*a* and 12*h*, respectively, engage the stop pins 18, 19 and 20, respectively, on the card holder 14 and restrain the holder 14 and the card 24 from moving. In like manner, the detent means 29, 30 and 31 extend from the selecting bars 10*b*, 11*a* and 12*j*, respectively and engage the stop pins 21, 22 and 23, respectively on the card holder 15 restraining it and the card 25 from moving. The card holder 14 has the arms 76 and 77 extending out from the circular center portion at an acute angle with respect to each other, while the card holder 15 has the arms 78 and 79 extending out from its central portions at the same acute angle. These arms serve to hold the cards 24 and 25, which are placed in the holders 14 and 15 so that each of the arms engages the card at one of its edges.

Since the arms holding a card form an angle less than 360 degrees with respect to each other, each card is shaped like a sector of a circle. The cards 24 and 25 are secured to the holder by means of the clamps 40 and 41, respectively, which fasten at one end to the card holders 24 and 25 by means of the studs 44 and 45, respectively, and at the other end to the cards and holders by means of the spring-like action of the clamps. If the clamps are made from resilient material and if each card be secured in its holder by a clamp on each side of the card, a simple means of securing the card is provided but at the same time the card may be easily removed when desired. The holders are allowed to remain stationary while the shaft 13 is rotated by motor means not shown, since the holders 14 and 15 are mounted on the friction clutches 16 and 17, respectively, which slip while the shaft turns.

Assume now that card 24 is the selected card. Thus the code number to be dialed is "108," which will actuate the magnets 10*b*, 11*a* and 12*h* and on account of the action of these magnets on the magnetic plates 37*b*, 38*a* and 39*h*, the magnets will attract the selecting rods 34*b*, 35*a* and 36*h* towards the magnets. As a result, the stop pins 18, 19 and 20 will be released and the holder 14 and card 24 will be free to turn in a clockwise direction along with the shaft 13. A radiating source 46 is placed on one side of the row of cards and a device 47 responsive to the radiating source is placed on the other side of the row so that when none of the cards is rotating the energy from the source 46 can energize the device 47 and cause an electrical signal to be obtained. It should be realized that a number of forms of radiant energy might be used such as photoelectricity, infra-red energy or ultra-violet energy. Thus, the source 46 might be an electric bulb or a source of infra-red or ultra-violet energy. Likewise, the responsive means 47 might be a photoelectric cell or selenium cell or any other means responsive to the above forms of energy. The following discussion will proceed on the assumption that photoelectric energy is used, such that the source 46 will be a light bulb and the responsive means 47 will be a photoelectric tube. The positions of the bulb 46 and tube 47 are shown in Fig. 1 with a lens 52 also being shown as the means whereby the light from the bulb 46 may be concentrated in a beam before it impinges on the photoelectric tube 47. However, when a card starts to rotate, it crosses the line of sight between the bulb 46 and photoelectric tube 47 and thus interrupts the current in the photoelectric circuit, which will be described more fully in connection with the discussion of Fig. 2. This interruption of the electric current serves as the start signal for the output code. A series of transparent portions are around the periphery of each card at a radius which will cause the portions to be in the line of sight between the bulb 46 and tube 47 as the card rotates. If the periphery of the card be divided into a number of equal arcs and if in each equal arc, five possible positions for transparent portions are located, locating two transparent portions out of the five possible positions for portions will give ten different combinations of transparent portions in each arc. By varying the possible combinations in the various arcs of each card, a different output code may be obtained for each card. Thus, five equal arcs have been taken on the periphery of the cards shown in Fig. 1 and card 24 may have transparent portions located in the second and fourth positions on the first arc while card 25 may have transparent portions located in the first and fourth positions of the first arc. Likewise, in the second arc, card 24 may have transparent portions located in the third and fifth positions, with transparent portions in the first and third positions being located in the second arc of card 25. It may be seen, therefore, that different codes may be established by dividing the periphery of the cards up into a number of equal arcs and varying the positions of the transparent portions in the different arcs. Additionally, a number of different codes may be established on each card merely by placing series of transparent portions along arcs which have different radii from the shaft 13. Thus, choice of a particular code might be made by adjusting the distance of the electric bulb 46 and the photoelectric tube 47 from the shaft 13. Or, instead of adopting a new output registration for the selective card by changing the position of the bulb 46 and the photoelectric tube 47, other bulbs and other photoelectric tubes may be used to respond to the other series of holes. Thus, Fig. 1 shows the bulb 80 and the photoelectric tube 81 responsive to a second series of transparent portions on the cards 24 and 25. Similarly, the same effect would be obtained if holes were punched to replace the transparent portions, since the holes would allow light from the bulb 46 to pass through and energize the output circuit. By this means a plurality of signal codes may be recorded on each card, if so desired, and a plurality of output registers may thereby be controlled by each operation of the single input register. Additionally, instead of a series of holes as the means for obtaining the output code pattern, a series of notches on the periphery of the card may be used as the means for obtaining the output code. The radiant energy circuit would then be completed when a notch became aligned with the radiating source and responsive means. If a new pattern of holes is desired for a card, the card may be replaced merely by pulling the card out of the card holder, since the spring-like clamps similar to the clamps 40 on the holder 14 permits such removal. This act, it may be seen, may be accomplished even while the translator is in operation. The new card may be inserted by pressing down on the card with a little force.

By the time the selected card has almost completed one rotation, the three magnets which caused the card to be released will cease to be excited and therefore they will exert no attractive force on their associated selecting bars. The reason for this is that the magnets are fast-acting and fast-releasing devices and operate only for a short interval after a number is dialed. However, since the selecting bars are out of their normal position, the springs which connect the free ends of the selecting bars to an immovable plate 48 are stretched and accordingly tend to contract, pulling the selecting bars back into position to engage the stop pins when the card holder has made a complete rotation. The holder of the selected card will then be held stationary until the next time the card is chosen. The springs 49*a* through 49*j*, inclusive, fasten the selecting bars 34*a* through 34*j*, respectively, to the plate 48, while the springs 50*a* through 50*j* fasten the selecting bars 35*a* through 35*j*, respectively, and the springs 51*a* through 51*j* help to position the selecting bars 36*a* through 36*j*, respectively.

Figure 2:
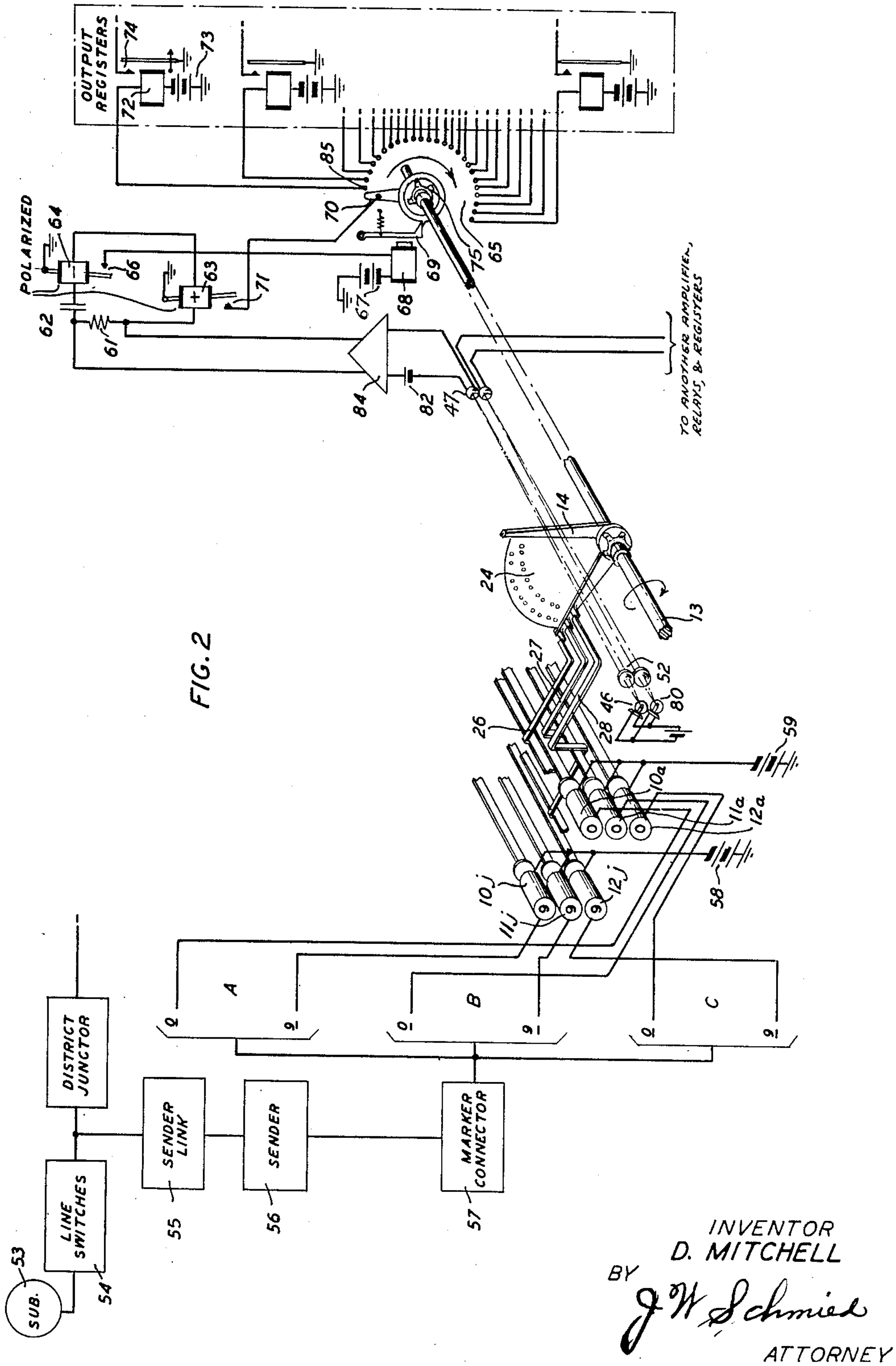
Fig. 2 is a simplified circuit diagram of the electrical features of the invention, as seen in relation to the mechanical features shown in Fig. 1.

Fig. 2 shows in a simplified circuit diagram the electrical features of the invention from the subscriber's telephone to the output registers. When the subscriber lifts his receiver 53 off the hook, idle line switches 54 hunt and find the subsciber's line and connect it through a sender link 55 to a sender 56 which stores the dialed information and feeds this information into the appropriate input registers through the marker connector 57.

These registers are magnets which are energized when chosen by the subscriber's code number. As described in connection with Fig. 1, one of the magnets 10a through 10j, is excited by the first number of a three-digit code number that is dialed, the actual magnet that is chosen depending upon the value of the first digit that is dialed. Likewise, one of the magnets 11a through 11j, inclusive, will be excited by the second number dialed and one of the magnets 12a through 12j, inclusive, by the third number dialed. Voltage for the excitation of the magnets is supplied by batteries, such as the batteries 58 and 59. A return path is provided by grounding the free end of the batteries as well as one end of the sender 56. The selecting bars associated with the actuated magnets are then attracted towards the magnets, leaving a card free to rotate. As shown in Fig. 2, light from the electric bulb 46 then shines on the photoelectric tube 47 in intervals determined by the holes cut in the periphery of the rotating card. These bursts of energy pass through a circuit composed of an alternating current amplifier 84; a differentiating circuit comprising the resistance 61 and the condenser 62; the polarized relay 64, which responds only to negative pulses and which acts to operate magnet 68 and release latch 69; and the polarized relay 63, which is actuated only by positive pulses and which serves to send energy, when actuated, through the contacts of the switch 65 to the output register relays which are connected to these contacts. The battery 82 and the alternating current amplifier 84 are connected in series with the photoelectric tube 47, and the resistance 61 is connected in parallel with the output terminals of the amplifier 84. The amplifier 84 is of the alternating current variety so as to be able to respond more easily to the negative surge which energizes the magnet 64 and releases the latch 69. The magnets 64 and 63 are in series with the condenser 60, while all of these are in parallel with the resistance 61. Before any card is released, the photoelectric tube 47 is constantly being made to conduct current by radiation from the electric bulb 46 so that current flows from the battery 82 through the input of amplifier 84. When the current is interrupted as a card starts to rotate, the current in the photoelectric cell ceases thus sending a negative pulse through the amplifier 84 into the resistance 61 and producing a negative pulse in magnets 63 and 64. This pulse is in such a direction as to excite the magnet 64, thus causing the contact 66 to close. Since a continuous circuit will now be obtained from the battery 67 through the magnet 68 to the contact 66 and back to the grounded terminal of the battery 67 by way of the grounded side of the contact 66, the magnet 68 will now be energized and will act to lift the latch 69 which was preventing the rotary contact 70 of the switch 65 from moving. The rotary contact 70 is coupled to the rotating shaft 13 by means of the friction clutch 75 and, in rotating, establishes continuity with a plurality of contacts on the switch 65, the number of contacts corresponding to the number of possible positions for holes around the periphery of the cards. Although the rotary contact 70 is coupled to the rotating shaft 13, the contact 70 may be held stationary on the rotating shaft 13 because the friction clutch 75 allows the contact 70 to slip with respect to the shaft whenever the restraining latch 69 is engaged.

Since the rotary contact 70 is released for rotation only when a selected card is released, and since both the rotary contact and the card are coupled to the shaft 13, the rotary contact 70 and the selected card will rotate synchronously. Furthermore, the switch 65 is designed to have a number of stationary contacts equal to the number of possible positions for holes on the periphery of a card, and the stationary contacts on the switch are positioned so that a hole on the card will be aligned with the bulb 46 and photoelectric tube 47 at the same time that the rotary contact 70 passes over a contact on the switch 65 corresponding to the particular hole on the card. A separate output register relay is connected to each stationary contact on the switch 65 and a battery is connected between each magnet and ground. Thus, for example, the output register relay 72 is connected to the first stationary contact 85 of the switch 65 and the battery 73 serves as the energizing means for the relay 72. Whenever a hole in the rotating card allows the light beam to pass, the photoelectric cell momentarily draws current. This produces a positive pulse which operates magnet 63. Operation of magnet 63 establishes a continuous circuit from one of the output relay batteries through its associated output register relay and the corresponding contact on the switch 65 to the rotary contact 70 and then back to the battery by way of the ground on the contact 71. Thus, current will flow through the stationary contacts on the switch 65 in a pattern corresponding to the pattern of the holes on the selected card, the rotary switch 65 and switch arm 70 serving as a distributor of potential impulses to the output register relays. Thus, if the card 24 is selected, current will flow through the second and fourth contacts of the switch 65 and will energize the output register relays connected to these contacts, since holes are located in the second and fourth positions of the first arc. Likewise, because of the fact that holes are located in the third and fifth positions of the second arc of the card 24, the output register relays associated with the eighth and tenth contacts of the switch 65 will be energized. Whenever an output register relay, such as the relay 72 connected to the first contact of the switch 65, is energized by current flowing from its battery, such as the battery 73 associated with the relay 72, a contact is closed, permitting the output information to be passed on to the output registers themselves, which will assess the output information and accordingly choose the proper lines. The contact 74 is the contact that closes when the relay 72 is actuated.

While certain specific embodiments of the invention have been described, it should be understood that various other embodiments of the invention may be made by those skilled in the art without departing from the spirit of the invention as defined within the scope of the appended claims.

What is claimed is:

1. A translating arrangement comprising, a plurality of input registers, a plurality of output registers, a plurality of code cards mounted on a rotatable shaft, said cards having a distinctive array of transparent portions corresponding to a predetermined code, means for holding said cards against rotation, said means operable under the control of said input registers to selectively release a single card for rotation, and radiant energy means cooperating with the transparent portion of said selected card to control operation of said output registers in accordance with the code of said selected card.

2. A translating arrangement comprising a plurality of input registers, a plurality of output registers, a plurality of code cards mounted on a common rotating shaft, each of said cards having a distinctive array of transparent portions corresponding to a predetermined code, means for holding said cards against rotation, said means operable under the control of said input registers to selectively release a single card for rotation, and radiant energy means cooperating with the transparent portion of said selected card to control operation of said output registers in accordance with the code of said selected card.

3. A translating arrangement comprising a plurality of input registers, a plurality of output registers, a plurality of card holders rotatably mounted upon a common rotating shaft, restraining means for preventing the rotation of said holders while said shaft rotates, a plurality of code cards mounted one in each of said holders, said card being perforated in accordance with a predetermined code, means under the control of said input registers whereby said restraining means associated with any selected holder may be released so as to allow said selected holder to rotate, and means controlled by the perforations in the code card mounted on said released holder to operate said output registers in accordance with the code of said selected card.

4. A translating arrangement comprising a plurality of input registers, a plurality of output registers, a plurality of card holders clutch mounted on a common rotating shaft, means for restraining said holders against rotation, a plurality of code cards mounted one on each of said holders, said cards having transparent portions corresponding to predetermined codes, means under the control of said input registers for releasing a selected card holder for rotation, and photoelectric means cooperating with the transparent portions of the card in said selected holder to control operation of said output registers in accordance with the code of said selected card.

5. A translating arrangement comprising a plurality of input registers, a plurality of output registers, a plurality of card holders rotatably mounted on a common rotating shaft, a plurality of selecting bars, a plurality of stop pins attached to each of said holders, certain of said selecting bars engaging the stop pins on each of said holders and thereby restraining the holders from rotating, a plurality of code cards mounted on said holders, each of said code cards having a plurality of transparent portions in a distinctive array corresponding to a predetermined output code, groups of said input registers operating on combinations of said selecting bars to release said holders singly for rotation, and radiant energy means operable through the transparent portions of such released card in rotation to control operation of said output registers in accordance with the code of said transparent portions.

6. A translating arrangement comprising a plurality of input registers, a plurality of output registers, a plurality of rotatable card holders, a plurality of stop pins attached to each of said holders, a plurality of selecting bars, detent means attached to said selecting bars for engaging the stop pins on said holders and thereby restraining the holders from rotating, a plurality of distinctively perforated code cards removably mounted on said holders, combinations of said input registers operable simultaneously in cooperation with said selecting bars to release a single holder for rotation, and photoelectric means operable by radiation through perforations of a card in said selected holder to control the operation of said output registers.

7. A translating arrangement comprising a plurality of input registers, a plurality of output registers, a rotating shaft, a plurality of card holders mounted on said shafts by means of a separate friction clutch for each of said holders, a plurality of stop pins attached to each of said holders, and normally engaged by a plurality of selecting bars whereby said holders are restrained from rotating, a plurality of cards removably mounted on said holders, said cards having a plurality of transparent portions corresponding with predetermined output codes, combinations of said input registers operable through said selecting bars to release a single holder for rotation, and photoelectric means operable by radiation transmitted through the transparent portions in a card mounted on said selected holder to control operation of said output registers.

8. A translating arrangement comprising, a plurality of input registers grouped in a number of banks corresponding to the number of digits in an input code signal, the number of registers in each bank corresponding to the number of integers possible for each digit of the code signal, a plurality of card holders selectably mounted on a rotating shaft, means for restraining said card holders from rotation, said means controllable by simultaneous operation of one input register in each bank to release a single card holder for rotation, a plurality of distinctively perforated cards mounted one in each of said holders, photoelectric responsive means operable by transmission of radiant energy through such distinctive perforations in a selected card when rotated, and a plurality of output registers controllable by said photoelectric means to establish an output registration corresponding to the code of perforations in any selected card in rotation.

9. A translating arrangement comprising a plurality of input registers grouped in a plurality of banks corresponding to the number of digits in the input code signal, the number of registers in each bank corresponding to the number of integers possible for each digit in the code signal, a plurality of card holders rotatably mounted on a shaft, means for driving said holders individually in rotation, means controllable by simultaneous operation of one input register from each bank whereby any one of said holders may be selected for rotation, a plurality of distinctively perforated code cards mounted one in each of said holders, photoelectric means responsive to radiant energy transmitted through such perforations of any selected card in rotation, and a plurality of output registers under the control of said photoelectric means to establish an output registration corresponding to the code of perforations in such selected card.

10. A plurality of input registers, a plurality of card holders, means for driving said holders in a circular path, detent means extending from said registers to said holders in different combinations whereby only one holder is released for movement by the operation of a combination of registers, a code card bearing information recorded by a distinctive array of transparent portions mounted in each of said holders, and output means for registering the information recorded on any selected card as its holder describes a circular path.

11. A plurality of input registers, a plurality of card holders, a card detachably mounted in each holder, information recorded on each of said cards by a distinctive pattern of perforations, means for driving said cards in a circular path, detent means extending from said registers to said holders in different combinations whereby one holder is released for rotation upon the operation of a combination of registers, and output means for registering the information recorded on a card in said holder as it describes its circular path.

12. A plurality of input registers, a plurality of card holders, coded information punched in a card of each holder, means for driving said holders in a circular path, a plurality of stop pins attached to each card holder, detent means extending from said registers to said stop pins in different combinations whereby only one holder is released for movement by the operation of a combination of registers, and output means for registering the information recorded on a card in said holder as it describes its circular path.

13. A plurality of input registers, a plurality of distinctively perforated cards mounted detachably in individual card holders, means for driving said holders in a circular path, a plurality of stop pins attached to each holder, a plurality of selecting bars operable by said input registers, detent means extending from said selecting bars to said stop pins in different combinations whereby only one card holder is released for movement by the operation of a combination of said input registers, and output means for registering the pattern of perforations of a card in any such released holder as it traverses its circular path.

14. A translating arrangement comprising an input register, an output register, a plurality of rotatable card holders, a plurality of selecting bars for restraining said holders against rotation, said selecting bars being controllable by said input register whereby under the control of a distinctive registration set up in said input register one of said card holders may be released for rotation, a plurality of cards mounted one on each of said holders, said cards being individually perforated in distinctive patterns corresponding to predetermined output codes, and means controlled by the distinctive perforations of a selected card for operating said output registers.

15. As a subcombination for use in a translator, a plurality of rotatable members each having a pair of arms adapted to receive a code card, a plurality of cards perforated according to predetermined codes and adapted to fit between said arms, spring brackets extending from said rotatable members whereby said cards may be held within said arms, means for selectively rotating any one of said members and causing one of said cards to rotate to the exclusion of the others.

16. A plurality of plates of opaque material, each plate having a plurality of transparent portions arranged in accordance with a predetermined code, a register control means for selecting one of said plates in accordance with an input code, a source of radiant energy, a radiant energy responsive means aligned with said source, means for rotating said selected plate in a circular path extending between said source and said responsive means in a manner to interrupt said radiant energy by the opaque portions of said plate but to allow said energy to pass through said transparent portions successively as said plate rotates, and a circuit controlled by electrical impulse from said energy responsive means.

17. A plurality of opaque plates having transparent portions arranged according to predetermined codes, means for selecting one of said plates in accordance with one code, a source of radiant energy directed at a radiant energy responsive means, additional means for driving said selected plate through a circular path intersecting the path of said radiant energy whereby the opaque and transparent portions of said plate respectively interrupt and transmit said radiant energy in a sequence of impulses corresponding to the code of said transparent portions, a rotary switch having a plurality of contacts corresponding in number and angular displacement to all of the possible positions for said transparent portions, said switch driven in synchronism with said selected plate, and a plurality of relays controlled by the operation of said switch and said radiant energy responsive means.

18. A generally opaque plate having its opacity penetrated by a plurality of transparent portions spaced in accordance with a predetermined code, means for driving said plate in cyclical motion, a radiant energy producing means, a radiant energy receiving means responsive to said producing means as said radiant energy is interrupted by the cyclical motion of said opaque plate, amplifying means associated with said radiant energy responsive means, polarity sensitive relays operable by the output of said amplifier, a multicontact switch controlled by said relays, means for closing the contacts of said switch sequentially in timed relation to the driving of said plate, and a plurality of output register relays operable in sequence by said multicontact switch whereby registration is established corresponding to the coded arrangement of transparent portions in said opaque plate.

19. An opaque card perforated in accordance with a predetermined code, means for driving said card cyclically, a plurality of contact elements, a movable contact arm for establishing electrical connection with said elements in sequence, means for driving said movable contact arm in synchronism with said card, radiant energy means operable through perforations of said card, an alternating current amplifier controlled by said radiant energy means, two polarized relays operable by positive and negative impulses respectively from said amplifier whereby potential may be applied intermittently to said movable contact arm during intervals when perforations of said card are aligned with said radiant energy means, and a plurality of relays selectively operable through said movable contact arm.

20. A method of translating an input signal in one code to an output signal in a different code, said method comprising the steps of registering said input signal, releasing for rotation a perforated card selected from a plurality of such cards in accordance with the registered code of said input signal, and successively energizing a plurality of output registers selected in accordance with the distinctive pattern of perforations in said card.

21. A translator comprising a plurality of cards, each card having a plurality of transparent portions or openings and non-transparent portions arranged according to a predetermined code, selective means for releasing one of said cards for movement, means operable upon such release to move the selected card through a definite path of motion, a source of radiant energy aligned with said portions in succession during said motion, an energy responsive device also aligned with said portions in succession during said motion whereby time-spaced impulses of current are created in accordance with said predetermined code arrangement, a plurality of impulse responsive means, and means for distributing said impulses to said impulse responsive means.

22. A translator comprising radiant energy producing means, and radiant energy responsive means, a plurality of radiant energy interceptor elements located so as to be movable with respect to a radiant energy path between said producing means and said responsive means, said interceptor elements having cut-out portions and non-cut-out portions arranged according to a predetermined code, said portions alternately intercepting and not intercepting respectively said energy when said elements are moved with respect to said radiant energy path, driving means for causing relative movement between said producing means and said interceptor elements such that a plurality of said coded portions are moved with respect to said radiant energy path, means for selecting one of said elements to the exclusion of others for such relative movement in accordance with a coded input signal, electrical paths controlled by said radiant energy responsive means according to radiant energy impinging thereupon, and means including register means connected to said electrical paths to register a code which is a combined function of said coded input signal and the coded arrangement of the portions of said selected element.

DOREN MITCHELL.

REFERENCES CITED

The following references are of record in the file of this patent:

UNITED STATES PATENTS

| Number | Name | Date |
|---|---|---|
| 1,035,043 | Peterson | Aug. 6, 1912 |
| 1,645,573 | Bascom | Oct. 18, 1927 |
| 1,860,967 | Tate | May 31, 1932 |
| 1,990,019 | Blackwood | Feb. 5, 1935 |
| 2,075,536 | Miller | Mar. 30, 1937 |
| 2,361,240 | Stibitz | Oct. 24, 1944 |